(12) United States Patent
Ji et al.

(10) Patent No.: US 11,119,234 B1
(45) Date of Patent: Sep. 14, 2021

(54) SYSTEMS AND METHODS FOR DETECTING SEISMIC DISCONTINUITIES USING SINGULAR VECTOR VARIANCES (71) Applicant: Saudi Arabian Oil Company, Dhahran (SA)

(72) Inventors: Xu Ji, Dhahran (SA); Yue Ma, Beijing (CN); Hongbin Xiao, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/029,201

(22) Filed: Sep. 23, 2020

(51) Int. Cl.
*G01V 1/34* (2006.01)
*G01V 1/30* (2006.01)

(52) U.S. Cl.
CPC .............. *G01V 1/34* (2013.01); *G01V 1/301* (2013.01); *G01V 2210/643* (2013.01)

(58) Field of Classification Search
USPC .......................................................... 702/16
See application file for complete search history.

(56) References Cited

U.S. PATENT DOCUMENTS

| | | | |
|---|---|---|---|
| 5,245,587 A | 9/1993 | Hutson | |
| 5,971,095 A * | 10/1999 | Ozbek | G01V 1/364 181/112 |
| 6,188,964 B1 * | 2/2001 | Reister | G01V 1/362 702/17 |
| 10,338,246 B1 | 7/2019 | Abel et al. | |
| 2002/0116131 A1 * | 8/2002 | Meek | G01V 1/28 702/14 |
| 2015/0331123 A1 | 11/2015 | Guigne et al. | |

OTHER PUBLICATIONS

Bekara et al., "Local singular value decomposition for signal enhancement of seismic data", Geophysics, vol. 72, No. 2, pp. V59-V65, Mar.-Apr. 2007.
Gersztenkorn et al., "Eigenstructure-based coherence computations as an aid to 3-D structural and stratigraphic mapping", Geophysics, vol. 64, No. 5, pp. 1468-1479, Sep.-Oct. 1999.
Martins et al., "Adaptive Singular Value Decomposition Filtering to Enhance Reflectors and Geological Structures in 3D Seismic Data", Revista Brasileira de Geofisica, vol. 34, No. 2, pp. 217-224, 2016.

* cited by examiner

*Primary Examiner* — Paul D Lee
(74) *Attorney, Agent, or Firm* — Dinsmore & Shohl LLP (57) ABSTRACT

A method for generating a geophysical image of a subsurface region includes defining a computational sub-volume for the geophysical image including a predetermined number of seismic traces of a plurality of seismic traces and a predetermined number of samples per each one of the plurality of seismic traces, generating a data matrix corresponding to a first sub-volume of the subsurface region based on the defined computational sub-volume, the data matrix comprising the predetermined number of samples for the predetermined number of traces of a portion of a seismic dataset corresponding to the first sub-volume. The method also includes performing a singular value decomposition and estimating a coherence between the predetermined number of traces of the data matrix by performing a weighted sum of a variance of a plurality of right singular vectors of the data matrix, and assigning the estimated coherence to a location in the geophysical image.

20 Claims, 8 Drawing Sheets

SYSTEMS AND METHODS FOR DETECTING SEISMIC DISCONTINUITIES USING SINGULAR VECTOR VARIANCES

BACKGROUND

Field

The present specification generally relates to geophysical data interpretation and, more particularly, to systems and methods for generating a geophysical image by estimating a plurality of coherences between a plurality of seismic traces.

Technical Background

Seismic exploration involves the generation of raw seismic data by providing seismic energy at various points within a surveyed location. When propagating through the subsurface, the seismic energy may encounter various changes in subsurface properties (e.g., changes in density, porosity, and material). For example, the seismic energy may reflect back towards the surface at interfaces between various substrata or other discontinuities. Such reflections may have varying frequency, amplitude, and phase characteristics based on the nature of the discontinuity encountered by the seismic energy. By measuring these reflections, information regarding subsurface formations can potentially be obtained. For example, a plurality of receivers may be used to generate a plurality of traces, with each trace containing information regarding the reflections of the seismic energy propagating through the subsurface.

The process of deducing subsurface features from collected seismic data is known as geophysical data interpretation. Deduction of complex subsurface features (e.g., narrow strata) from raw seismic data is difficult because each trace may represent a combination of reflections from a plurality of different subsurface features. To unpack information regarding the subsurface from collected seismic data, techniques to measure the coherence between various seismic traces are typically used. Coherence gives a numerical indication of the continuity between two or more seismic traces and provides a parameter to generate visual images based on seismic data to reveal more subtle geologic features than when simply viewing raw seismic data.

Existing coherence estimation techniques may utilize an eigenvalue-based approach involving the computations of a covariance matrix of collected trace data. Such techniques typically estimate the coherence based on mathematical approaches utilizing the total energy of the seismic traces in a denominator of a quotient. One drawback to such an approach is that it produces artifacts in the produced image where trace energies are close to zero (e.g., where there are weaker reflections). Such artifacts may be ignored in interpretive analysis, leading to smaller, more subtle subsurface features being missed and therefore an incomplete picture of the subsurface being obtained.

Accordingly, a new approach for estimating seismic coherence for generating a subsurface image and identifying geological discontinuities in collected seismic data is needed.

SUMMARY

According to an embodiment of the present disclosure, a method for generating a geophysical image of a subsurface region comprises defining a computational sub-volume for the geophysical image, wherein the computational sub-volume includes a predetermined number of seismic traces of a plurality of seismic traces and a predetermined number of samples per each one of the plurality of seismic traces. The method also includes generating a data matrix corresponding to a first sub-volume of the subsurface region based on the defined computational sub-volume, the data matrix comprising the predetermined number of samples for the predetermined number of traces of a portion of a seismic dataset corresponding to the first sub-volume. The method also includes performing a singular value decomposition of the data matrix to compute a plurality of left singular vectors, a plurality of singular values, and a plurality of right singular vectors of the data matrix. The method also includes estimating a coherence between the predetermined number of traces of the data matrix by performing a weighted sum of a variance of the plurality of right singular vectors. The method also includes assigning the estimated coherence to a location in the geophysical image corresponding to the first sub-volume. The method also includes generating a plurality of additional data matrices corresponding to a plurality of additional sub-volumes of the subsurface region, performing singular value decompositions of each of the plurality of additional data matrices, estimating coherences for the traces of each of the plurality of additional sub-volumes, and assigning the estimated coherences to locations in the geophysical image corresponding to the plurality of additional sub-volumes.

In another embodiment, a method of detecting a geological discontinuity in a subsurface region comprises dividing seismic data into a plurality of data analysis volumes, each data analysis volume comprising a plurality of seismic traces of the seismic data. The method also includes generating a data matrix for each of the plurality of data analysis volumes, wherein each data matrix comprises a plurality of signal values for each of the plurality of seismic traces. The method also includes calculating, for each generated data matrix, a set of singular values and a set of right singular values by performing a singular value decomposition on each of the generated data matrices. The method also includes estimating a coherence between the plurality of seismic traces in each of the plurality of data analysis volumes by computing a variance for each right singular vector in a set of right singular vectors for each generated data matrix, multiplying each variance by a corresponding one of the singular values to compute a weighted variance, and summing the weighted variances for each of the generated data matrices to generate an estimated coherence for each of the plurality of data analysis volumes. The method also includes correlating each of the estimated coherences to a location in the subsurface region corresponding with the data analysis volume to generate a coherence image of the subsurface region. The method also includes identifying a location of a geological discontinuity in the subsurface region based on the coherence image.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

In yet another embodiment, a system comprises one or more processors and one or more non-transitory memory modules communicatively coupled to the one or more processors and storing machine-readable instructions. The instructions, when executed, cause the one or more processors to divide seismic data into a plurality of data analysis volumes, each data analysis volume comprising a plurality of seismic traces of a geophysical dataset. The instructions also cause the one or more processors to generate a data matrix for each of the plurality of data analysis volumes, wherein each data matrix comprises a plurality of signal values for each of the plurality of seismic traces. The instructions also cause the one or more processors to calculate, for each generated data matrix, a set of singular values and a set of right singular values by performing a singular value decomposition on each of the generated data matrices. The instructions also cause the one or more processors to estimate a coherence between the plurality of seismic traces in each of the plurality of data analysis volumes by computing a variance for each right singular vector in a set of right singular vectors for each generated data matrix, multiplying each variance by a corresponding one of the singular values to compute a weighted variance, and summing the weighted variances for each of the generated data matrices to generate an estimated coherence for each of the plurality of data analysis volumes. The instructions also cause the one or more processors to correlate each of the estimated coherences to a location in a subsurface region corresponding with the data analysis volume to generate a coherence image of the subsurface region.

Reference will now be made in detail to embodiments of systems and methods for generating a geophysical image of a subsurface region by estimating coherences between a plurality of different sets of seismic traces using a singular value decomposition of a data matrix containing samples for each of the seismic traces. The methods disclosed herein include generating or receiving a seismic data collected from the subsurface region. The seismic data may include a plurality of seismic traces generated through a seismic survey of the subsurface region. The methods disclosed herein also include defining a computational sub-volume for the geophysical image based on a desired geometrical distribution of traces and samples to be used in the coherence estimation described herein. The computational sub-volume encloses a predetermined number of traces and a predetermined number of samples for each one of the traces. A data matrix is generated for a sub-volume of the subsurface region containing the predetermined numbers of traces and samples per trace. A singular value decomposition is then performed on the data matrix to compute a plurality of singular values $\sigma_i$ and a plurality of right singular vectors $v_i$ for the sub-volume of the subsurface region. A coherence between the predetermined number of traces in the sub-volume is then estimated based on a weighted sum of the variances of the right singular vectors $v_i$, where the variance of each right singular vector $v_i$ is weighed by a corresponding singular value $\sigma_i$. The estimated coherence is then assigned a location in the geophysical image, and the process is repeated to generate a plurality of additional estimated coherences using data matrices corresponding to a plurality of additional sub-volumes of the sub-surface region and assigning those estimated coherences to various other locations in the geophysical image.

Beneficially, estimating the coherence using a variance of the singular vectors generates an image that is more continuous and contains less severe artifacts as compared to existing coherence estimation techniques. Such existing approaches may utilize total trace energy a divisor of a quotient, leading to image discontinuities when imaging traces having relatively low energies. These discontinuities may lead to small subsurface features—leading to lower energy reflections—in the subsurface region not being included in the image. The systems and methods described herein, by not using such an energy-based quotient, generate images not containing these discontinuities for relatively low energy reflections, allowing for the detection of more subtle geological discontinuities in the subsurface region.

As used herein, the phrase "shared processor circuit" refers to a single processor circuit that executes some or all of the machine-readable instructions from multiple modules of one or more non-transitory computer-readable mediums of a memory.

As used herein, the phrase "group processor circuit" refers to a processor circuit that, in combination with additional processor circuits, executes some or all of the machineexecutable instructions from the multiple modules of one or more non-transitory computer-readable mediums. References to multiple processor circuits encompass multiple processor circuits on discrete dies, multiple processor circuits on a single die, multiple cores of a single processor circuit, multiple threads of a single processor circuit, or a combination of the above.

As used herein, the term "module" may refer to, be part of, or include: an Application Specific Integrated Circuit (ASIC); a digital, analog, or mixed analog/digital discrete or integrated circuit; a combinational logic circuit; a field programmable gate array (FPGA); a processor circuit that executes machine-readable instructions; a memory circuit that stores machine-readable instructions executed by the processor circuit; other suitable hardware components that provide the described functionality; or a combination of some or all of the above.

Figure 1:
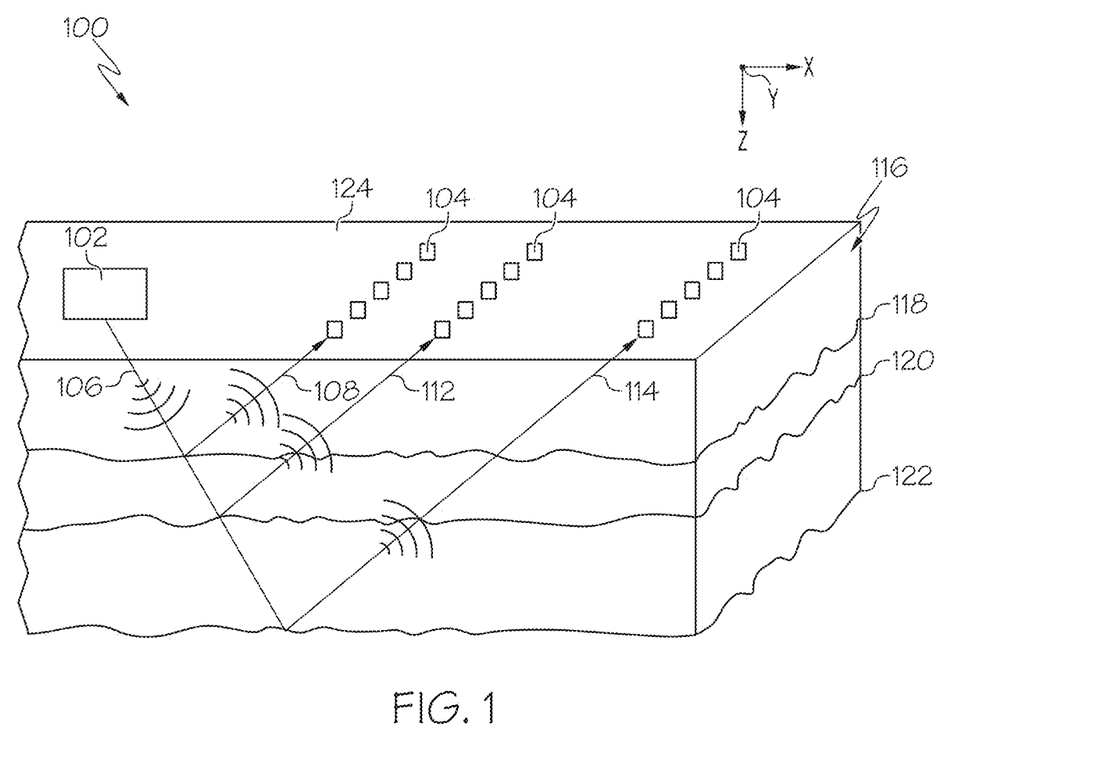
FIG. 1 schematically depicts a seismic data collection system, according to one or more embodiments described herein.

Referring now to FIG. 1, a seismic data collection system 100 is depicted, according to an example embodiment. In embodiments, the seismic data collection system 100 is configured to collect seismic data to generate a geophysical image of a subsurface region 116. As depicted, the seismic data collection system 100 includes a seismic source 102 configured to direct seismic energy 106 into the subsurface region 116 and a plurality of receivers 104 configured to receive reflections 108, 112, and 114 of the seismic energy 106 off of various geological discontinuities 118, 120, and 122. The seismic source 102 may include a sound generator (e.g., an active sound source, such as a hammer and plate, a sound gun, or an explosive; or a passive sound source such as thunder or an indirect sound source like human activity) configured to generate vibrational energy that propagates through the subsurface region 116.

In embodiments, the seismic source 102 may be movable (e.g., disposed on a truck, boat, or other motor vehicle) to produce seismic energy from a plurality of different locations on the surface 124 (e.g., along a line in an in-line direction—the x-direction in FIG. 1). In embodiments, the seismic data collection system 100 includes a plurality of seismic sources 102 disposed in an array (e.g., along a line in an in-line or the x-direction) to generate seismic data from a plurality of different orientations with respect to the geological discontinuities 118, 120, and 122.

The plurality of receivers 104 are depicted to be arranged in a grid-like pattern. In embodiments, the receivers 104 are equally spaced in both the x-direction and the y-direction (e.g., the cross-line direction) to generate a uniform measurement of the subsurface region 116. In embodiments, the receivers 104 may have a non-uniform distribution or any distribution of any shape or configuration. The seismic data collection system 100 may include any number of receivers 104 depending on the implementation. The receivers 104 are generally configured to convert vibrations in the subsurface region 116 (e.g., caused by reflections 108, 112, and 114) into an electrical signal (e.g., a voltage) and store the electrical signal. Deviations of the electrical signals generated via the receivers 104 are measured as a seismic response of the subsurface region 116. The reflections 108, 112, and 114 may each induce separate seismic responses in each one of the receivers 104. In embodiments, the electrical signals generated and stored by each one of the receivers 104 over a time period comprises a separate seismic trace of the subsurface region 116. In embodiments, such seismic traces may be time sampled to generate the seismic data described herein.

Though source-receiver geometry for a single-ended spread survey is depicted in FIG. 1, it should be appreciated that the configuration depicted in FIG. 1 is exemplary only and that other source-receiver geometries associated with other survey types may also be used. The systems and methods described herein may be used to generate geophysical images of a subsurface region using seismic data gathered through any technique.

Geological discontinuities 118, 120, and 122 may take various forms depending on the nature of the subsurface region 116. The geological discontinuities 118, 120, and 122 may cause variations in the seismic responses measured by the receivers 104 (e.g., due to reflections 108, 112, and 114). For example, the geological discontinuities 118, 120, and 122 may comprise a variation in stratigraphy (e.g., subsurface layers of different composition), structure (e.g., a fault or a channel), porosity, and the presence of subsurface hydrocarbons. Accurate knowledge of all of the geological discontinuities 118, 120, and 122 within the subsurface region 116 are important for certain applications such as petroleum exploration because such discontinuities may be directly correlated with the formation of subsurface traps for hydrocarbons.

It is difficult to obtain accurate knowledge of the geological discontinuities 118, 120, and 122 using raw data measured via receivers 104. Raw seismic data obtained directly from the receivers 104 is typically noisy. Additionally, each trace measured via the receivers 104 may contain information pertaining to a plurality of different reflections. Absent a known model of the subsurface region, containing reflection coefficients accurately representing the geological discontinuities 118, 120, and 120, an image containing each of the raw traces measured via the receivers 104 contain little usable information. Accordingly, geophysical data interpretation relies on various image processing techniques to enhance the raw data and generate images containing useful information.

Figure 2:
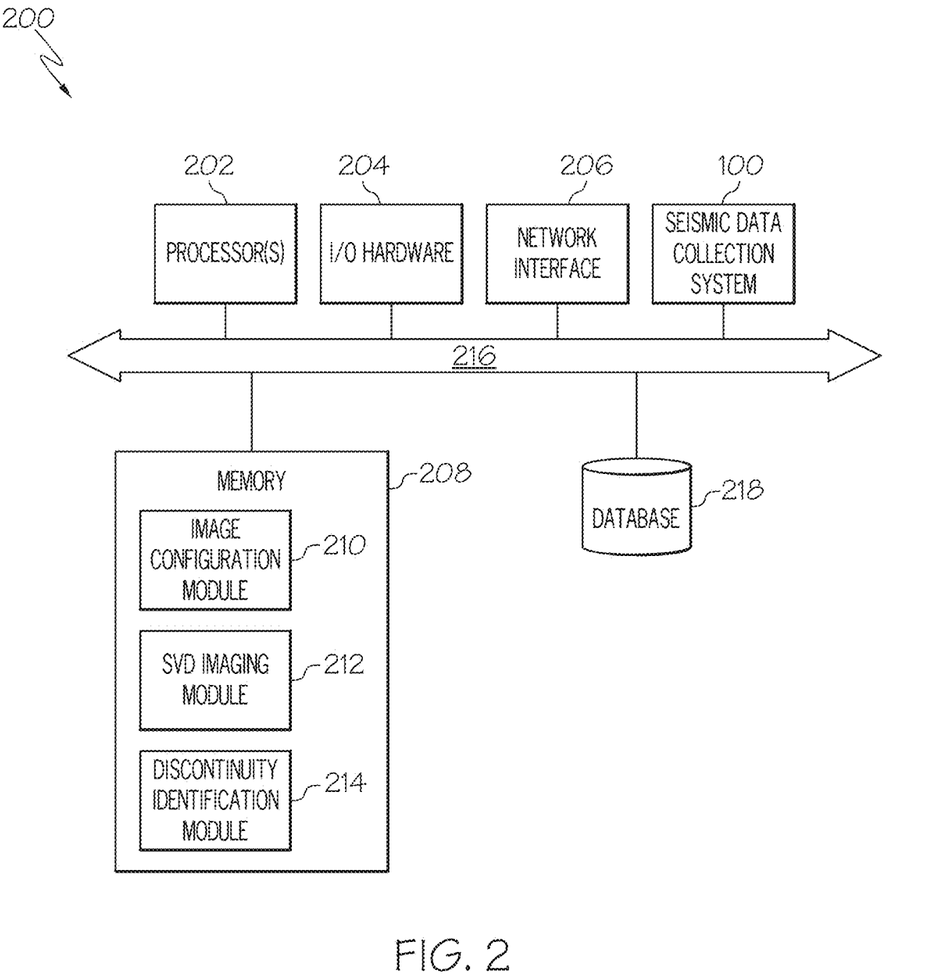
FIG. 2 schematically depicts a seismic imaging system, according to one or more embodiments described herein.

With reference to FIG. 2, an example embodiment of a seismic imaging system 200 is depicted. The seismic imaging system 200 is generally configured to generate a seismic image of the subsurface region 116 from raw geophysical data, such as the seismic traces collected via seismic data collection system 100 described herein with respect to FIG. 1. As depicted, the seismic imaging system 200 includes a processor 202, input/output ("I/O") hardware 204, a network interface 206, a communications bus 216, a memory 208, and a database 218. In the depicted example, the seismic imaging system 200 also includes the seismic data collection system 100 described with respect to FIG. 1. For example, in embodiments, the seismic imaging system 200 may comprise a computing system connected to the plurality of receivers 104 of the seismic data collection system 100 to generate geophysical images based on the seismic signals generated via the plurality of receivers 104 in real-time as the data is collected. In embodiments, the seismic imaging system 200 may communicate with the seismic data collection system 100 over a network via the network interface 206 to receive the data collected via the seismic data collection system 100. In embodiments, the seismic imaging system 200 does not communicate with the seismic data collection system 100 and seismic data may be uploaded to the seismic imaging system 200 via the I/O hardware 204.

While the seismic imaging system 200 is depicted to include a single processor 202, it should be appreciated that the seismic imaging system 200 may include any number of processors depending on the implementation. The processor 202 can include any suitable processing device, such as a microprocessor, microcontroller, integrated circuit, logic device, and/or other suitable processing device. In embodiments, the processor 202 is a processing circuit (e.g., either a single processing circuit or a group processing circuit) that executes some or all of the machine-readable instructions from multiple modules of one or more non-transitory computer-readable mediums (e.g., the memory 208).

I/O hardware 204 may include at least one element to receive inputs from a user and/or provide results of the computations performed via the seismic imaging system 200 to a user. For example, in embodiments, the I/O hardware 204 may include a basic input/output system (BIOS) that interacts with hardware of the seismic imaging system 200, device drivers that interact with particular devices of the seismic imaging system 200, one or more operating systems, user applications, background services, background applications, and the like. The network interface 206 can include any suitable components for interfacing with one or more network(s), including for example, transmitters, receivers, ports, controllers, antennas, and/or other suitable components. The network interface 206 may include and/or be configured to communicate with any wired or wireless networking hardware, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. The database 218 may generally comprise a data storage component communicably coupled to the processor 202 via the communication bus 216. As a non-limiting example, the database 218 may include one or more database servers that support NoSQL, MySQL, Oracle, SQL Server, NewSQL, and/or the like.

The memory 208 is communicatively coupled to the processor 202. As a non-limiting example, the memory 208 may comprise one or more non-transitory computer-readable mediums that may be one of a shared memory circuit, dedicated memory circuit, or group memory circuit. Non-limiting examples of the memory include random access memory (including SRAM, DRAM, and/or other types of random access memory), read-only memory (ROM), flash memory, registers, compact discs (CD), digital versatile discs (DVD), and/or other types of storage components. Memory 208 may store instructions accessible to the processor 202 via an addressing scheme such that the processor 202 may access the memory 208 to execute the instructions in accordance with a program to perform any of the functions and operations described herein.

The memory 208 is depicted to include an image configuration module 210, a SVD imaging module 212, and a discontinuity identification module 214. It should be appreciated that these modules are exemplary only and that the memory 208 may include any number of modules to perform the various functions of the seismic imaging system 200 described herein and the functions performed by the image configuration module 210, the SVD imaging module 212, and the discontinuity identification module 214 may be performed by any other module consistent with the present disclosure.

The image configuration module 210 is configured to generate image parameters based on a seismic data to be used by the seismic imaging system 200 to generate a geophysical image. The image parameters generated via the image configuration module 210 may include, for example, defining a computational sub-volume used by the SVD imaging module 212 to generate a geophysical image from a plurality of seismic traces. As described herein, the computational sub-volume may determine a number of seismic traces used in a particular coherence estimation to form a value assigned to a particular location in the geophysical image. The computational sub-volume may also define a predetermined number of time samples associated with each one of the seismic traces (e.g., the vertical duration of a time window) to be used in the coherence estimation.

Particular aspects of the computational sub-volume generated via the image configuration module 210 may be determined based on characteristics of geological discontinuities desired to be included in the geophysical image. For example, geological discontinuities of shorter vertical duration (e.g., relatively thin strata) may require a smaller computational sub-volume (e.g., including less time samples per seismic trace) than geological discontinuities of longer vertical duration. In embodiments, the number of time samples per seismic trace may depend on a sampling rate used to collect the seismic data. In an example, 11 samples per trace is used as a default value for a 4 ms sampling rate. A larger vertical window (e.g., having more than 11 samples per trace) may filter out more noises and make larger samples more prevalent, but may obscure more narrow features. In embodiments, structural features including reflector offset (e.g., extending at an angle to the surface 124 depicted in FIG. 1), such as faults may require more time samples per seismic trace than relatively flat discontinuity with no reflector offset. Stratigraphic features characterized by waveform tuning, such as channels, may require less time samples per seismic trace in the computational sub-volume than geological discontinuities not characterized by waveform tuning. In an example, the computational sub-volume includes 25 seismic traces (e.g., a 5×5 array extending in the cross-line and inline direction) and was able to adequately image most features desired.

In addition to defining the computational sub-volume used to generate the geophysical image, the image configuration module 210 may also generate additional image parameters. For example, in embodiments, the image configuration module 210 may determine a size of a subsurface region to be included in a particular geophysical image and the amount of data to incorporate into the image computations performed by the SVD imaging module 212. The size of the subsurface region to be imaged may be determined based on characteristics of the seismic data used to generate the image (e.g., received from the seismic data collection system 100). For example, in embodiments, the size of the subsurface region to be imaged may depend on the number of receivers used to collect seismic data (e.g., a number of available seismic traces).

In embodiments, the image configuration module 210 may generate parameters for the geophysical image based on inputs received from the user. For example, in embodiments, a user may identify a set of geological continuities desired to be imaged and the image configuration module may generate a set of image parameters (e.g., defining a computational sub-volume having a particular number of traces and a particular number of samples per trace) based on the identified set of geological discontinuities. In embodiments, the user may also input a desired size of subsurface region to be imaged. In embodiments, the image configuration module 210 may automatically generate a plurality of sets of image parameters used by the SVD imaging module 212 to generate a plurality of geophysical images using each set of image parameters.

In embodiments, the image configuration module 210 may also perform various pre-processing steps on received seismic data. For example, in embodiments, the image configuration module 210 may include noise removing filters or the like to smoothen the received seismic data prior to processing via the SVD imaging module 212. In embodiments, other data corrections, such as the normal moveout correction and dip steering, may also be performed via the image configuration module 210.

Referring still to FIG. 2, the SVD imaging module 212 is configured to generate a plurality of data matrices containing subsets of the seismic data contained in the seismic data and generate an estimated coherence for each one of the data matrices. The data matrices generated via the SVD imaging module 212 may each correspond to a sub-volume of the subsurface region being imaged. For example, in embodiments, to generate the plurality of data matrices, the SVD imaging module 212 defines a 3D analysis volume having a predetermined shape (e.g., a 3D analysis cube) and containing the predetermined number of traces (e.g., a predetermined number in both the in-line direction and the cross-line direction) of the computational sub-volume generated via the image configuration module 210. The 3D analysis volume may also contain a depth based on the predetermined number of samples determined via the image configuration module 210. For example, the image configuration module 210 may define a computational sub-volume including N number of traces (e.g., including $\sqrt{N}$ traces in the cross-line and in-line directions, respectively) and M samples per trace. In this example if each data value in the seismic data is provided with a sample index $i=1, \ldots, M$, and a trace number index $j=1, \ldots, N$, a data matrix D may be denoted by:

$$D = \begin{pmatrix} d_{11} & d_{12} & \ldots & d_{1N} \\ d_{21} & d_{22} & \ldots & d_{2N} \\ \vdots & \vdots & \ddots & \vdots \\ d_{M1} & d_{M2} & \ldots & d_{MN} \end{pmatrix}. \tag{1}$$

A column of each data matrix D represents a particular trace (e.g., measured via one of the receivers 104 described with respect to FIG. 1 herein) with M samples. Each row of D denotes the same time sample for each of the predetermined number of traces N contained in the computational sub-volume. In embodiments, the 3D analysis volume is essentially a window sliding in both space and time over the seismic data to generate a plurality of data matrices D.

The SVD imaging module 212 may generate any number of data matrices depending on the implementation. For example, in embodiments, the SVD imaging module 212 defines a data analysis cube for each sample contained in the received seismic data (e.g., each sample may be centered in each data analysis cube) to generate a relatively high resolution image using the methods described herein. Alternative implementations, including more or fewer data analysis cubes and therefore more or fewer generated data matrices than in the preceding example are also envisioned.

Figure 3:
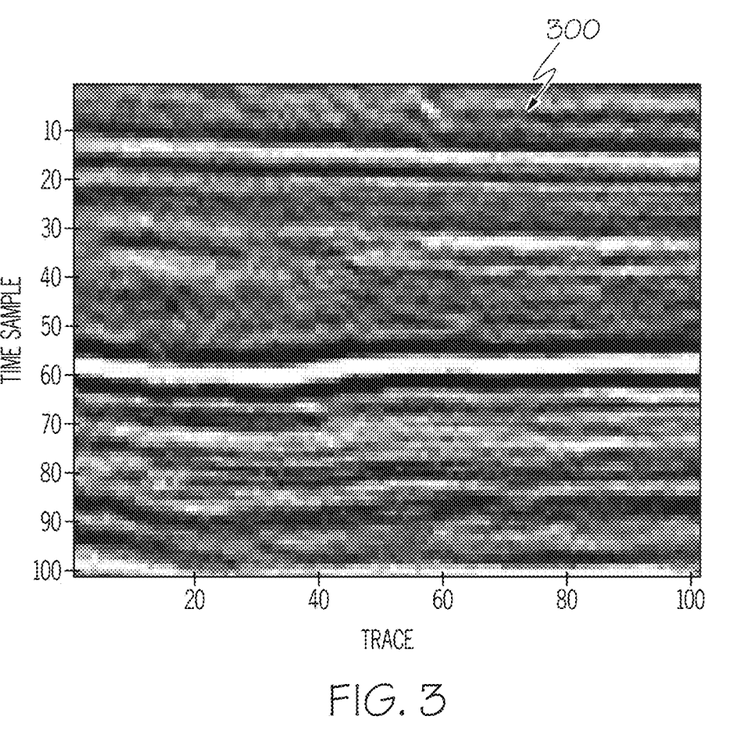
FIG. 3 depicts an example image of seismic data processed via the seismic imaging system depicted in FIG. 2, according to one or more embodiments described herein.

Referring now to FIG. 3, a geophysical image 300 of data contained in an example data matrix D is depicted. As depicted, the data matrix D comprises approximately 100 seismic traces (e.g., 10 in a cross-line and 10 in in-line direction) and approximately 100 samples per trace. As such, the data matrix D represents a cube-shaped sub-volume of a subsurface region. Information pertaining to geological discontinuities contained in the imaged subsurface region may be obtained by measuring a coherence between the traces contained in the data matrix D, which is performed via the remainder of the processing performed via the SVD imaging module 212 depicted in FIG. 2.

Referring again to FIG. 2, after generating the data matrices based on the seismic data, the SVD imaging module 212 may perform a singular value decomposition (SVD) on each data matrix D. In embodiments where each data matrix D is of an M×N dimension, as in the example discussed above, the singular value decomposition may be described as $$D = U\Sigma V^T, \tag{2}$$

where $U=(u_1, u_2, \ldots, u_M)$ is an M×M unitary matrix, $\Sigma$ is a diagonal M×N matrix with non-negative real values $\sigma_1 \geq \sigma_2 \geq \ldots \geq \sigma_N$ on the diagonal known as the singular values (assuming N<M), and $V^T=(v_1, v_2, \ldots, v_N)^T$ is an N×N unitary matrix. The columns of the matrix U ($u_i$) are known as the left singular vectors of D and the columns of the matrix V ($v_j$) are known as the right singular vectors of D, respectively.

The SVD computation may include the computation of the eigenvalues and eigenvectors of the matrices $DD^T$ and $D^TD$. The eigenvectors of $D^TD$ make up the right singular vectors $v_j$ and the eigenvectors of $DD^T$ make up the left singular vectors $u_i$. The square roots of eigenvalues from the matrices $DD^T$ and $D^TD$ may be arranged in descending order and placed on a diagonal of the matrix $\Sigma$ such that the value $\Sigma_{1,1}$ is the square root of the largest eigenvalue of the matrices $DD^T$ and $D^TD$ (e.g., the value $\sigma_1$), the value $\Sigma_{2,2}$ is the square root of the second largest eigenvalue of the matrices $DD^T$ and $D^TD$ (e.g., the value $\sigma_2$), and so on.

In embodiments, multiplying a left singular vector $u_x$ by a corresponding right singular vector $v_x^T$ generates a matrix of rank one called an eigenimage of the data matrix D. The first eigenimage $u_1 v_1^T$ multiplied by the largest singular value $\sigma_1$ may represent a principle component of the data contained in the data matrix D. In certain instances, laterally coherent events (e.g., seismic reflections) resulting from subsurface features in the subsurface region contained in the 3D analysis volume may create linear dependencies among traces contained in the 3D analysis volume. Such laterally coherent events may show a relatively high degree of trace-to-trace correlation and be substantially represented by only a portion of the SVD computation performed via the SVD imaging module 212 described with respect to FIG. 2 (e.g., the principle component $u_1\sigma_1 v_1^T$, the second principle component $u_2\sigma_2 v_2^T$, and any additional components in a highest subset of the components generated via the SVD computation). Removal of lower order components outside of the highest subset of components may remove laterally incoherent events (e.g., produced by noise) from the data.

Figure 4:
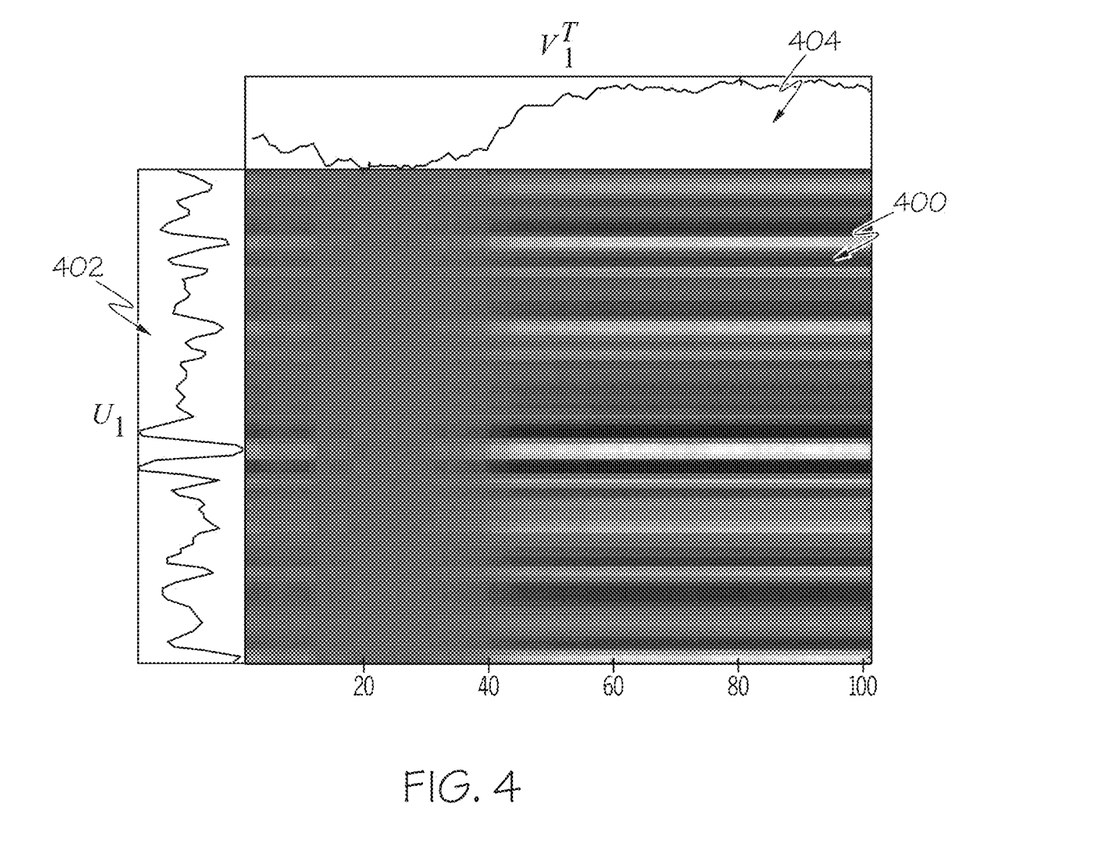
FIG. 4 depicts an image of a principal component of the data depicted in FIG. 3, according to one or more embodiments described herein.

Referring now to FIG. 4, an image 400 of the principle component $u_1\sigma_1 v_1^T$ of the data matrix D depicted in FIG. 3 is depicted. A plot 402 depicts magnitudes of the left singular vector $u_1$ and a plot 404 depicts magnitudes of the right singular vector $v_1^T$. As depicted, there is a relatively large variation in the magnitude of the right singular vector $v_1^T$ across the principle component $u_1\sigma_1 v_1^T$ that largely explains the variation between the raw (or not decomposed via the SVD computation) seismic data depicted in FIG. 3. As discussed above, the representation of the image of an entirety of seismic data by only the principle components of the seismic data via the SVD computation is generally dependent on the coherence between the plurality of seismic traces contained in the seismic data. Given this, a measure of the relative variation between the values in the right singular vector $v_1^T$ provides an approximation for the coherence between seismic traces contained in the 3D analysis volume.

In view of this, the SVD imaging module 212 of the seismic imaging system 200 depicted in FIG. 2 is configured to estimate a coherence for the sub-volume of the subsurface region encompassed via the 3D analysis volume by computing a weighted sum of the variance of the right singular vectors $v_1^T$ of the data matrix D. The weighted sum of the variance of the right singular vectors may be expressed as $$E_D = \sum_{i=1}^{N} \sigma_i \text{Var}(v_i) = \sum_{i=1}^{N} \sigma_i \sum_{j=1}^{m} (v_{ij} - \bar{v}_i)^2, \qquad (3)$$

where $\bar{v}_i$ is the mean of the singular vector $v_i$, i=1, . . . , N. As such, data matrices D with highly variable right singular vectors will tend to generate relatively large estimated coherence $E_D$. Of note is that the estimated coherence does not primarily depend on the absolute magnitude of the values contained in equation 3, but rather on the difference between individual values of the right singular vectors and the mean of the right singular vector. Given this, regions in the seismic data having relatively low signal may still contribute to the estimated coherence, provided that the corresponding right singular vector value differs from an average value of the right singular vector. By not primarily relying on the absolute signal magnitudes to estimate coherence, more subtle features may be identified in a resulting geophysical image.

Still referring to FIG. 2, upon computing an estimated coherence for a 3D analysis volume associated with a sub-volume of the subsurface region being imaged, the SVD imaging module 212 may assign the estimated coherence to a location in the geophysical image. The assigned location may correspond to the sub-volume. For example, in embodiments, the SVD imaging module 212 assigns the estimated coherence to a center of the 3D analysis volume used to generate the data matrix D from which the estimated coherence was calculated. After assigning the estimated coherence to a location in the geophysical image, the SVD imaging module 212 may move the 3D analysis volume to generate an additional data matrix D associated with another sub-volume of the subsurface region, re-perform the SVD computation for the additional data matrix D, estimate a coherence for the sub-volume, and assign the estimated coherence to another location in the geophysical image. In embodiments, the SVD imaging module 212 performs such a process until a coherence value is generated for each sample contained in the seismic data used to generate the geophysical image (e.g., such that each sample is at the center of a 3D analysis volume used to form a data matrix D). This way, the geophysical image possesses the same resolution as the collected seismic data.

In embodiments, the SVD imaging module 212 is configured to generate a display (e.g., user interface) viewable by a user of the seismic imaging system 200. For example, in embodiments, the geophysical image may be viewable via a display communicably coupled to the seismic imaging system 200 via the I/O hardware 204. In embodiments, the generated geophysical image may be stored in the database 218 and accessed by a separate computing system via the network interface 206. In embodiments, the seismic imaging system 200 may transmit the generated geophysical image via the network interface 206 for accessibility by other computing system over a network.

Still referring to FIG. 2, the discontinuity identification module 214 is configured to perform an analysis of the geophysical image generated by the SVD imaging module 212 to identify geological discontinuities in the imaged subsurface region. In embodiments, the discontinuity identification module 214 performs statistical analysis of the coherence values estimated via the SVD imaging module 212 to identify regions in the geophysical image containing geological discontinuities. For example, the discontinuity identification module 214 may compare various subsets of the estimated coherence values to identify regions within the geophysical image where the estimated coherence values are within a predefined range (e.g., above an average coherence within a larger region). In embodiments, the discontinuity identification module 214 may utilize a machine learning algorithm adapted to label regions of the geophysical image based on training data sets with pre-identified geological continuities. The discontinuity identification module 214 may output a report identifying regions containing a geological discontinuity and identifying the geological discontinuities contained in the geophysical image.

Figure 5:
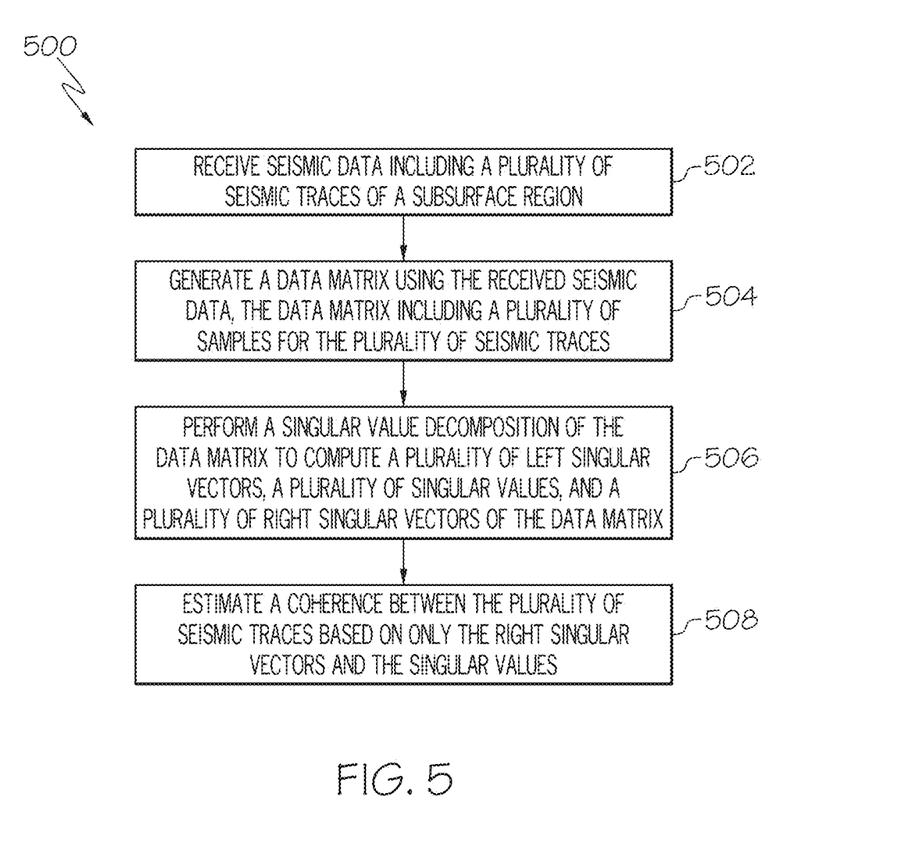
FIG. 5 depicts a process for estimating a coherence between a plurality of traces in seismic data using a singular value decomposition of a data matrix, according to one or more embodiments described herein.

Referring now to FIG. 5, a method 500 for estimating a coherence between a plurality of seismic traces is depicted, according to an example embodiment. The method 500 may be performed via the SVD imaging module 212 of the seismic imaging system 200 described herein with respect to FIG. 2. In embodiments, the coherence estimated via the method 500 may be used to generate a geophysical image viewable by a user of the seismic imaging system 200. In embodiments, the coherence estimated via the method 500 may be input into additional methods (e.g., performed via the discontinuity identification module 214) to identify a geological discontinuity in a subsurface region.

In a step 502, seismic data including a plurality of seismic traces of a subsurface region is received at the seismic imaging system 200. For example, the seismic data may be generated via the seismic data collection system 100 described herein with respect to FIG. 1. The seismic data collection system 100 may generate the seismic data and provide the seismic data directly to the seismic imaging system 200 via a connection (e.g., via a cable, via a wireless network, etc.) between the seismic imaging system 200 and the seismic data collection system 100. In embodiments, the seismic imaging system 200 (e.g., via the network interface 206) may retrieve the seismic data from a database (e.g., the seismic data may comprise a historical seismic data).

In a step 504, the SVD imaging module 212 generates a data matrix using the seismic data received at the step 502. As described herein, the seismic imaging system 200 (e.g., via the image configuration module 210) may define a computational sub-volume that defines aspects of the data set (e.g., number of traces, geometry of traces, number of time samples per trace) used to generate the matrix. Based on such defined aspects, the SVD imaging module 212 may define a 3D analysis volume for the seismic data. The 3D analysis volume may define a sliding window filter used to select a portion of the seismic data corresponding to a sub-volume of the subsurface region and the portion of the seismic data may be used to generate a data matrix D, as defined by equation 1 above. As such, the 3D analysis volume may include a predetermined number of traces and a predetermined number of samples for each one of the traces.

In a step 506, the SVD imaging module 212 performs a SVD computation on the data matrix generated during the step 506. The SVD computation may compute a plurality of left singular vectors, a plurality of singular values, and a plurality of right singular vectors of the data matrix. The plurality of left singular vectors, the plurality of singular values, and the plurality of right singular vectors of the data matrix may be generated utilizing equation 2 herein.

In a step 508, the SVD imaging module 212 estimates a coherence between the traces used to generate the data matrix at the step 504. The coherence is estimated based on only the right singular vectors and the singular values generated during the step 506. The estimated coherence may be calculated using equation 3 described herein. As described herein, geological discontinuities generating laterally coherent events in the seismic data will generate lateral correlations between the traces used to generate the data matrix. Such lateral correlations may be captured based on variances in the right singular vectors. The estimated coherence may be utilized by the seismic imaging system 200 to generate a geophysical image containing relatively subtle geological discontinuities for viewing by a user.

Figure 6:
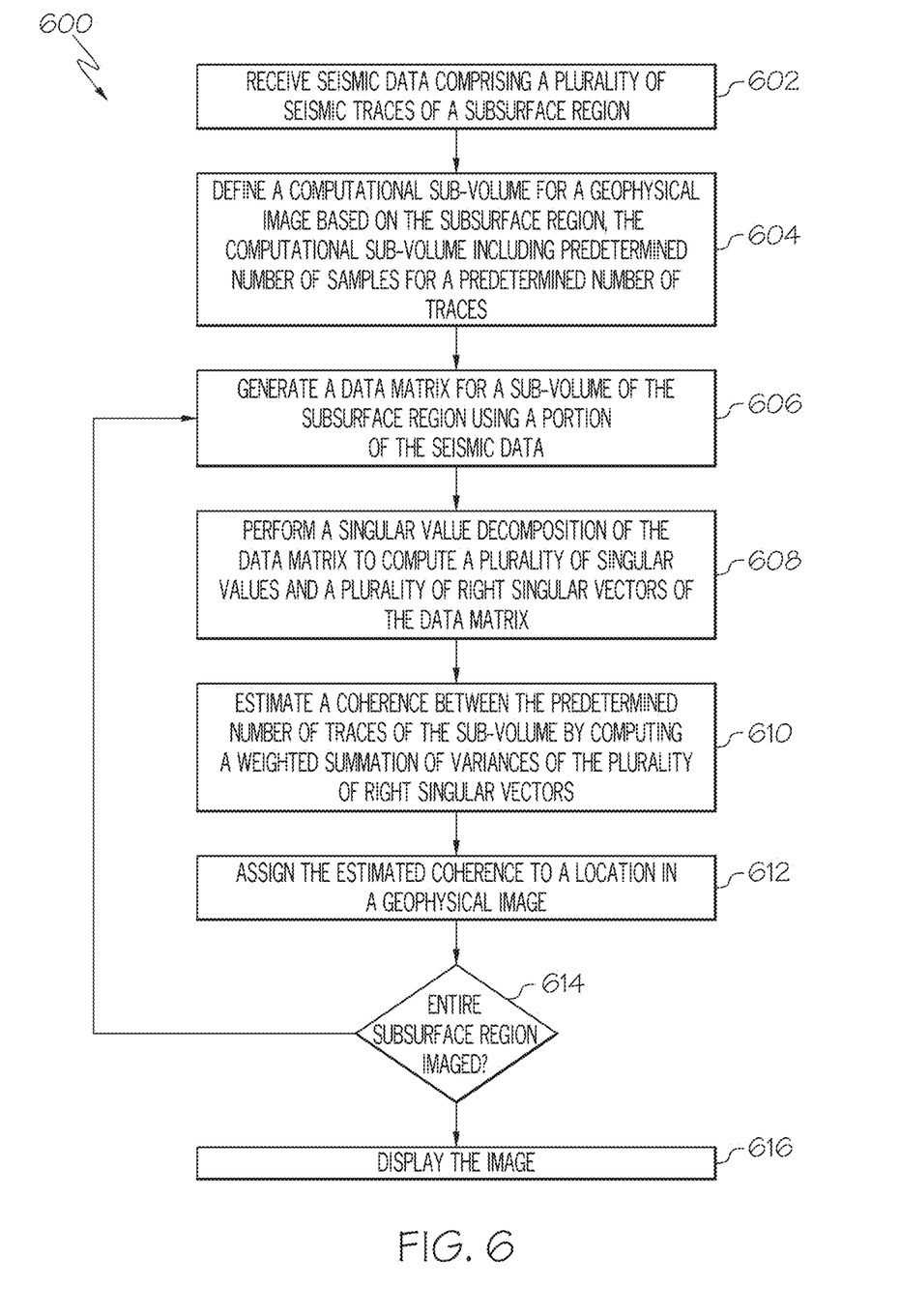
FIG. 6 depicts a process for generating a geophysical image of a subsurface region by estimating a plurality of coherences between a plurality of different sets of seismic traces, according to one or more embodiments described herein.

Referring now to FIG. 6, a method 600 for generating a geophysical image of a subsurface region is depicted. The method 600 may be performed via modules (e.g., the image configuration module 210 and the SVD imaging module 212) of the seismic imaging system 200 described herein with respect to FIG. 2. In a step 602, seismic data including a plurality of seismic traces of a subsurface region is received at the seismic imaging system 200. In embodiments, the step 602 may resemble the step 502 of the method 500 described with respect to FIG. 5.

In a step 604, the seismic imaging system 200 defines a computational sub-volume for a geophysical image based on the subsurface region. For example, in embodiments, the image configuration module 210 of the seismic imaging system 200 defines the computational sub-volume to include a predetermined number of traces of seismic data (e.g., including a first predetermined number of traces in a cross-line direction and a second predetermined number of traces in an in-line direction) and a predetermined number of samples for each of the traces of seismic data. The computational sub-volume may define a sliding time window or 3D analysis volume applied to the seismic data to obtain a portion or subset of the seismic data. In embodiments, the seismic imaging system 200 may determine a size and shape of the computational sub-volume based on a size of a geological discontinuity desired to be included in the image. For example, geological features having a shorter duration, such stratigraphic features like channels, may be better resolved having a relatively short time window (e.g., a relatively small number of time samples for each one of the seismic traces). In embodiments, the seismic imaging system 200 may determine a size and shape of the computational sub-volume based on an input from a user.

In a step 606, a data matrix is generated for a sub-volume of the subsurface region using the portion of the seismic data corresponding to the sub-volume. As described herein, the portion of the seismic data used to generate the data matrix may correspond in size with the computational sub-volume defined in the step 604. In embodiments, the seismic imaging system 200 may generate a data matrix D, as defined in equation 1 herein, for the sub-volume by selecting a first subset of the seismic data received at the step 602. In embodiments, the seismic imaging system 200 may perform pre-processing steps on the seismic data (e.g., noise removal, dip steering, etc.) prior to generating the data matrix D.

In a step 608, the seismic imaging system 200 (e.g., via the SVD imaging module 212) performs a SVD computation on the data matrix generated during the step 606. The SVD computation may compute a plurality of left singular vectors, a plurality of singular values, and a plurality of right singular vectors of the data matrix. The plurality of left singular vectors, the plurality of singular values, and the plurality of right singular vectors of the data matrix may be generated utilizing equation 2 herein. In a step 610, the seismic imaging system 200 estimates a coherence between the traces associated with the sub-volume of the subsurface region. In embodiments, the coherence is estimated based on only the right singular vectors and the singular values generated during the step 608. The estimated coherence may be calculated using equation 3 described herein. As described herein, geological discontinuities generating laterally coherent events in the seismic data will generate lateral correlations between the traces used to generate the data matrix. Such lateral correlations may be captured based on variances in the right singular vectors.

In a step 612, the seismic imaging system 200 assigns the coherence estimated in the step 610 to a location in a geophysical image. In embodiments, the assigned location may correspond to the sub-volume of the subsurface region used to generate the data matrix for the SVD computation in the step 606. As described herein, the sub-volume may correspond in size (e.g., include a predetermined number of traces and samples per trace) to the computational sub-volume defined in the step 604. As such, the overall size of the sub-volume may depend on the manner with which the seismic data received by the seismic imaging system 200 at the step 602. For example, if the seismic data is generated by the seismic data collection system 100 described with respect to FIG. 1, the layout of the array of receivers 104 may determine a size and shape of the sub-volume (e.g., if the computational sub-volume designates a predetermined number of traces, the spacing of the receivers 104 may determine the lateral extent of the sub-volume of the subsurface region). Given this, based on a size of the geophysical image to be generated, the seismic imaging system 200 may divide the image into imaging regions, with each of the imaging regions having a size proportional to the sub-volume of the subsurface region. The coherence estimated in the step 610 may be assigned to a location in the imaging region corresponding to the sub-volume of the subsurface region containing the seismic traces used to generate the data matrix at the step 608. In embodiments, the estimated coherence is assigned to a center of the imaging region corresponding to the sub-volume of the subsurface region.

A step 614 is a decision block where the seismic imaging system 200 determines if an entirety of the subsurface region has been imaged. For example, in embodiments, the seismic imaging system 200 may determine if a coherence has been estimated for each sample contained in the received seismic data. In embodiments, the seismic imaging system 200 may determine if an estimated coherence value has been generated for each of the imaging regions of the geophysical image. If the entire subsurface region has not yet been imaged, the method 600 may revert back to the step 606 to generate another data matrix for another sub-volume of the subsurface region using another portion of the seismic data. In embodiments, the sliding time window defined by the computational sub-volume may be moved to select an additional portion of the seismic data to generate an additional data matrix. The amount that the sliding time window is moved to select the additional portion may vary depending on the implementation. For example in embodiments, the sliding time window may move by a single time sample (e.g., to translate the sliding time window vertically in the subsurface region) and/or a single seismic trace (e.g., to translate the sliding window laterally in the subsurface region) to select an additional portion of the seismic data. In embodiments, the sliding time window may be moved by more than a single time sample or seismic trace to select an additional portion of the seismic data. After the additional portion of the seismic data is selected and a data matrix is generated for the additional portion, the method 600 then re-performs the steps 608, 610, and 612 for that additional portion to estimate a coherence between the plurality of seismic traces contained in the additional sub-volume and assign the estimated coherence to another location in the geophysical image.

After the entirety of the subsurface region (or a desired portion thereof) has been imaged, the geophysical image, containing an estimated coherence value in each imaging region corresponding to a different sub-volume of the subsurface region, is displayed in a step 616. In embodiments, the geophysical image may be output to a display communicably coupled to the seismic imaging system 200 (e.g., via the I/O hardware 204). In embodiments, the geophysical image is stored (e.g., in the database 218, in a remote server) such that additional computing systems may accessed by additional computing systems. In embodiments, the geophysical image is transmitted to an additional computing system (e.g., via the network interface 206) for viewing via the additional computing system.

Figure 7A:
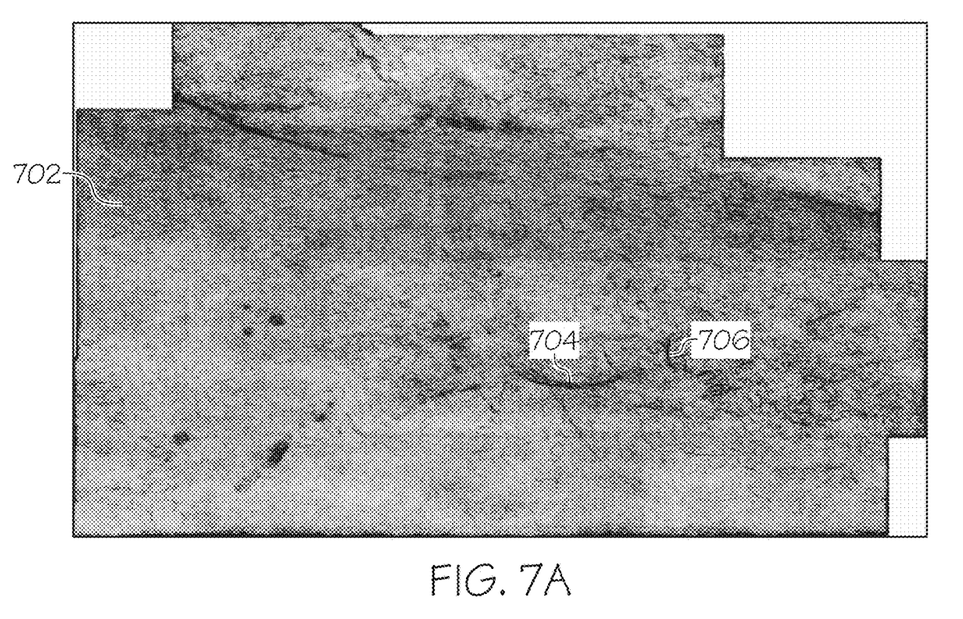
FIG. 7A depicts an image of seismic data generated using the method depicted in FIG. 6, according to one or more embodiments described herein.
Figure 7B:
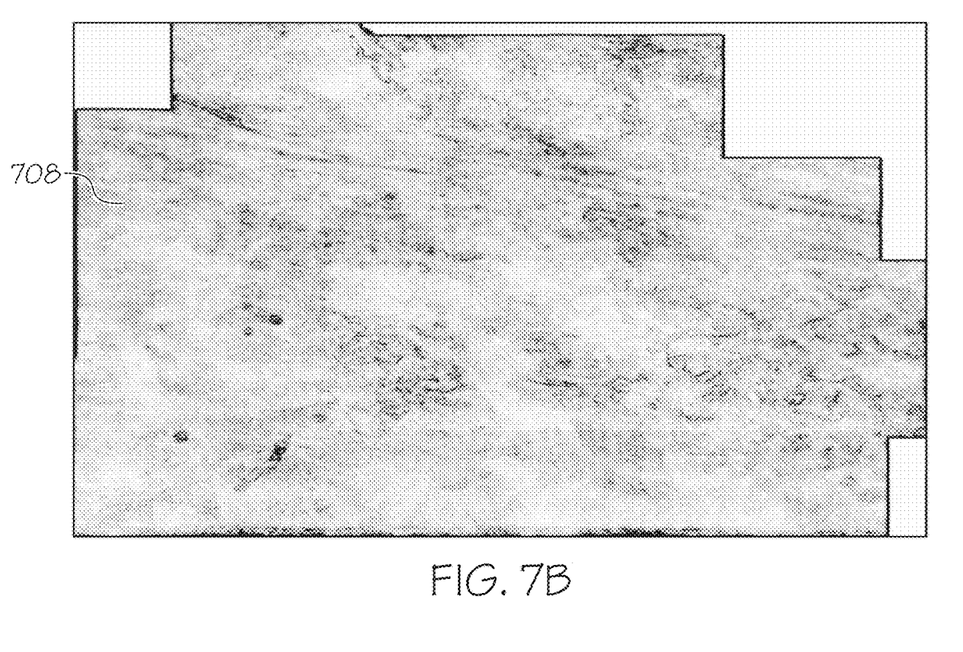
FIG. 7B depicts an image of seismic data generated using an existing eigenvalue-based approach to estimate coherence, according to one or more embodiments described herein.

Referring to FIG. 7A an example geophysical image 702 of a subsurface region generated via the seismic imaging system 200 is depicted. The geophysical image 702 was generated via performing the method 600 described with respect to FIG. 6. Referring to FIG. 7B an example geophysical image 708 of the same subsurface region using the same seismic data as that included in the geophysical image 702 of FIG. 7A is depicted. The geophysical image 708 was generated using existing coherence estimation techniques, relying on total trace energy. A comparison between geophysical images 702 and 708 reveals that the geophysical image 702 contains depictions of several geological discontinuities 704 and 706 that cannot be discerned in the geophysical image 708. As such, the ability of the systems and methods described herein to generate geophysical images containing more subtle geological discontinuities is demonstrated.

Figure 8:
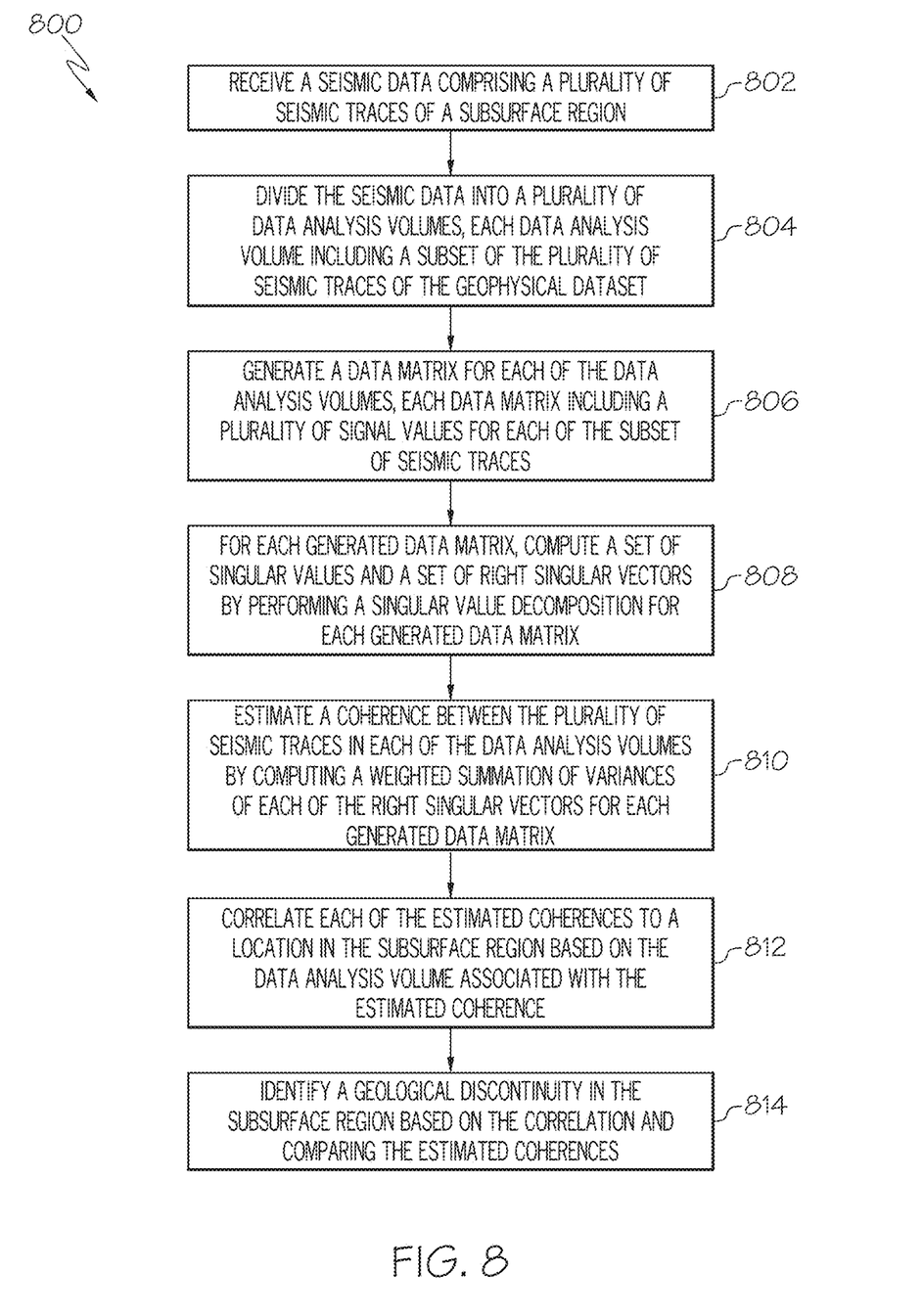
FIG. 8 depicts a process identifying a geological discontinuity by estimating a plurality of coherences between a plurality of different sets of seismic traces, according to one or more embodiments described herein.

Referring now to FIG. 8, a method 800 for identifying a geological discontinuity in a subsurface region is depicted. The method 800 may be performed via modules (e.g., the image configuration module 210, the SVD imaging module 212, and the discontinuity identification module 214) of the seismic imaging system 200 described herein with respect to FIG. 2. In a step 802, seismic data including a plurality of seismic traces of a subsurface region is received at the seismic imaging system 200. In embodiments, the step 802 may resemble the step 502 of the method 500 described with respect to FIG. 5.

In a step 804, the seismic imaging system 200 divides the seismic data received at the step 802 into a plurality of data analysis volumes. In embodiments, each of data analysis volume may include a subset of the plurality of seismic traces in the seismic data received in the step 802. For example, as described herein, the seismic imaging system 200 may separate the seismic data into a plurality of portions by applying a sliding time window to the seismic data defined based on a computational sub-volume defined by the seismic imaging system 200 to include a predetermined number of seismic traces and a predetermined number of samples for each one of the seismic traces. The data analysis volume may be sized to include a first predetermined number of seismic traces in an in-line direction and a second predetermined number of traces in a cross-line direction.

In a step 806, the seismic imaging system 200 generates a data matrix for each one of the data analysis volumes. Each data matrix may be generated based on equation 1 described herein and may include a plurality of signal values for each one of the seismic traces (e.g., based on a vertical duration of the sliding time window described herein). In a step 808, for each data matrix generated in the step 806, the seismic imaging system 200 computes a set of right singular vectors and singular values by performing a SVD computation on each generated data matrix. In a step 810, the seismic imaging system 200 estimates a coherence between the seismic traces in each of the data analysis volumes by computing a weighted summation of variances of each of the right singular vectors for each of the data matrices generated in the step 806. For example, the seismic imaging system 200 may estimate the coherences based on equation 3 described herein.

In a step 812, the seismic imaging system 200 may correlate each of the estimated coherences to a location in the subsurface region based on the data analysis volume associated with the estimated coherence. As described herein, each data analysis volume may correspond to a continuous sub-volume (e.g., cube) of the subsurface region from which the seismic data received at the step 802 was generated. In embodiments, the seismic imaging system 200 assigns the estimated coherence to a location in a geophysical image corresponding to the sub-volume of the subsurface region to generate a coherence map of the subsurface region based on the seismic data.

In a step 814, the seismic imaging system 200 identifies a geological discontinuity in the subsurface region based on the correlation performed in the step 812. As described herein, in embodiments, the seismic imaging system 200 (e.g., the discontinuity identification module 214) may include analysis engines configured to identify patterns in the estimated coherences (e.g., segments in the coherence map possessing relatively high or low coherence values as compared to averages within a region of the coherence map). In embodiments, the seismic imaging system 200 may classify identified patterns into discontinuity types based on aspects (e.g., boundary shapes) of the identified patterns. In embodiments, the seismic imaging system 200 may generate a geophysical image based on the estimated coherences and the correlation performed in the step 812 and overlay identifications of the patterns on the geophysical image.

In view of the foregoing description, it should be understood that estimating a coherence between a plurality of seismic traces by computing a weighted summation of variances of right singular vectors of a data matrix containing a predetermined number of samples for each one of the seismic traces facilitates the imaging and identification of more subtle geological discontinuities than current techniques. Beneficially, the coherence estimation techniques described herein do not result in image artifacts at low trace energies and allow for low amplitude seismic reflections to be represented in the resulting geophysical image and interpretation. Inclusion of such low amplitude seismic reflections provides a more complete geophysical image that may indicate subtle geological discontinuities such as faults, channels, and stratigraphic features that may be correlated with the existence of geological resources.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modifications and variations come within the scope of the appended claims and their equivalents.

What is claimed is:

1. A method for generating a geophysical image of a subsurface region, the method comprising:
    defining a computational sub-volume for the geophysical image, wherein the computational sub-volume includes a predetermined number of seismic traces of a plurality of seismic traces and a predetermined number of samples per each one of the plurality of seismic traces;
    generating a data matrix corresponding to a first sub-volume of the subsurface region based on the defined computational sub-volume, the data matrix comprising the predetermined number of samples for the predetermined number of traces of a portion of a seismic dataset corresponding to the first sub-volume;
    performing a singular value decomposition of the data matrix to compute a plurality of left singular vectors, a plurality of singular values, and a plurality of right singular vectors of the data matrix;
    estimating a coherence between the predetermined number of traces of the data matrix by performing a weighted sum of a variance of the plurality of right singular vectors;
    assigning the estimated coherence to a location in the geophysical image corresponding to the first sub-volume; and
    generating a plurality of additional data matrices corresponding to a plurality of additional sub-volumes of the subsurface region, performing singular value decompositions of each of the plurality of additional data matrices, estimating coherences for the traces of each of the plurality of additional sub-volumes, and assigning the estimated coherences to locations in the geophysical image corresponding to the plurality of additional sub-volumes.

2. The method of claim 1, wherein the weighted sum of the variance of the plurality of right singular vectors includes, for each singular vector $v_i$, computing a summation of values $(v_{i,j}-\bar{v}_i)^2$, where $\bar{v}_i$ is a mean of the singular vector $v_i$.

3. The method of claim 2, wherein, in the weighted sum, the summation of values $(v_{i,j}-\bar{v}_i)^2$ for each singular vector $v_i$ is multiplied by a corresponding singular value $\sigma_i$.

4. The method of claim 1, wherein the assigned location in the geophysical image corresponding to the first sub-volume corresponds to a center of the first sub-volume.

5. The method of claim 4, wherein the assigned locations in the geophysical image corresponding to the plurality of additional sub-volumes correspond to centers of each of the plurality of additional sub-volumes.

6. The method of claim 5, wherein the geophysical image includes an estimated coherence value corresponding to a position for each sample in the seismic dataset.

7. The method of claim 1, wherein each of the plurality of additional data matrices corresponding to the plurality of additional sub-volumes comprises the predetermined number of samples for the predetermined number of traces of portions of the seismic dataset corresponding to the plurality of additional sub-volumes.

8. The method of claim 7, wherein a size of the computational sub-volume is based on a target geological feature.

9. The method of claim 8, wherein the predetermined number of samples per each one of the predetermined number of seismic traces in the computational sub-volume is less than a threshold.

10. The method of claim 8, wherein the predetermined number of seismic traces comprises a first number of traces in a cross-line direction and a second number of traces in an in-line direction.

11. A method of detecting a geological discontinuity in a subsurface region, the method comprising:
    dividing seismic data into a plurality of data analysis volumes, each data analysis volume comprising a plurality of seismic traces of the seismic data;
    generating a data matrix for each of the plurality of data analysis volumes, wherein each data matrix comprises a plurality of signal values for each of the plurality of seismic traces;
    calculating, for each generated data matrix, a set of singular values and a set of right singular values by performing a singular value decomposition on each of the generated data matrices,
    estimating a coherence between the plurality of seismic traces in each of the plurality of data analysis volumes by computing a variance for each right singular vector in a set of right singular vectors for each generated data matrix, multiplying each variance by a corresponding one of the singular values to compute a weighted variance, and summing the weighted variances for each of the generated data matrices to generate an estimated coherence for each of the plurality of data analysis volumes;

correlating each of the estimated coherences to a location in the subsurface region corresponding with the data analysis volume to generate a coherence image of the subsurface region; and identifying a location of a geological discontinuity in the subsurface region based on the coherence image.

12. The method of claim 11, wherein each data analysis volume of the plurality of data analysis volumes comprises data corresponding to a continuous portion of the subsurface region.

13. The method of claim 11, wherein the seismic data comprises a seismic survey comprising a plurality of seismic traces in a cross-line direction and an in-line direction, wherein each of the plurality of seismic traces of each data analysis volume comprises a first number of traces in the cross-line direction and a second number of traces in the in-line direction.

14. The method of claim 11, wherein the dividing of the seismic data into the plurality of data analysis volumes comprises generating a data analysis volume for each data value contained in the seismic data such that an estimated coherence is generated for each data value contained in the seismic data.

15. The method of claim 11, wherein the plurality of signal values in each data matrix corresponds to a number of time samples associated with each of the plurality of seismic traces.

16. The method of claim 15, wherein the number of time samples for each of the plurality of seismic traces in each data matrix is based on expected duration of the geological discontinuity.

17. The method of claim 11, further comprising generating the seismic data by recording a seismic response of the subsurface region using a plurality of receivers to generate the plurality of signal values for each of the plurality of seismic traces.

18. The method of claim 11, further generating a rendering of the coherence image and displaying the rendering on a display.

19. A system comprising:
one or more processors; and
one or more non-transitory memory modules communicatively coupled to the one or more processors and storing machine-readable instructions that, when executed, cause the one or more processors to:
divide seismic data into a plurality of data analysis volumes, each data analysis volume comprising a plurality of seismic traces of a geophysical dataset;
generate a data matrix for each of the plurality of data analysis volumes, wherein each data matrix comprises a plurality of signal values for each of the plurality of seismic traces;
calculate, for each generated data matrix, a set of singular values and a set of right singular values by performing a singular value decomposition on each of the generated data matrices;
estimate a coherence between the plurality of seismic traces in each of the plurality of data analysis volumes by computing a variance for each right singular vector in a set of right singular vectors for each generated data matrix, multiplying each variance by a corresponding one of the singular values to compute a weighted variance, and summing the weighted variances for each of the generated data matrices to generate an estimated coherence for each of the plurality of data analysis volumes; and
correlate each of the estimated coherences to a location in a subsurface region corresponding with the data analysis volume to generate a coherence image of the subsurface region.

20. The system of claim 19, where the machine readable instructions, when executed, cause the one or more processors to further identify a geological feature contained in the coherence image by comparing at least two of the estimated coherences.

* * * * *

UNITED STATES PATENT AND TRADEMARK OFFICE
CERTIFICATE OF CORRECTION

| | | |
|---|---|---|
| PATENT NO. | : 11,119,234 B1 | Page 1 of 1 |
| APPLICATION NO. | : 17/029201 | |
| DATED | : September 14, 2021 | |
| INVENTOR(S) | : Xu Ji et al. | |

It is certified that error appears in the above-identified patent and that said Letters Patent is hereby corrected as shown below:

On the Title Page

Column 1, item (56), U.S. patent documents, cite no. 3, delete "Reister" and insert --Reister et al.--, therefore.

In the Specification

In Column 9, Line(s) 24, delete "$\sqrt{N}$" and insert --$\sqrt{N}$--, therefore.

In Column 11, Line(s) 6, delete "$v_1{}^T$" and insert --$v_i^T$--, therefore.

Signed and Sealed this
Fifteenth Day of November, 2022

Katherine Kelly Vidal
*Director of the United States Patent and Trademark Office*